(12) United States Patent  
Lo et al.

(10) Patent No.: US 9,719,648 B2
(45) Date of Patent: Aug. 1, 2017

(54) AUTOMOBILE LAMP HAVING A LIGHTING PATTERN WITH A LIGHT-AND-SHADE CONTRAST

(71) Applicant: WITSLIGHT TECHNOLOGY CORPORATION LIMITED, Apia (WS)

(72) Inventors: Yi-Chien Lo, Miaoli County (TW); Chien-Jung Tseng, Changhua County (TW); Kuo-Pin Wu, Yilan County (TW); Cheng-Chien Chen, Yilan County (TW)

(73) Assignee: Witslight Technology Corporation Limited, Apia, Samoa ( * ) Notice: Subject to any disclaimer, the term of this patent is extended or adjusted under 35 U.S.C. 154(b) by 49 days.

(21) Appl. No.: 14/848,337

(22) Filed: Sep. 9, 2015

(65) Prior Publication Data

US 2017/0067610 A1    Mar. 9, 2017

(51) Int. Cl.
  *F21V 8/00* (2006.01)
  *F21S 8/10* (2006.01)
  *F21Y 115/10* (2016.01)

(52) U.S. Cl.
  CPC ....... *F21S 48/1283* (2013.01); *F21S 48/1154* (2013.01); *F21S 48/1241* (2013.01); *F21S 48/1291* (2013.01); *G02B 6/0096* (2013.01); *F21S 48/1258* (2013.01); *F21Y 2115/10* (2016.08)

(58) Field of Classification Search
  CPC ............... F21S 48/1283; F21S 48/1241; F21S 48/2225; F21S 48/2231; F21S 48/2237; F21S 48/2243; F21S 48/225; F21S 48/2262; F21S 48/2293; F21S 48/2268; F21S 48/125; F21S 48/1258; G02B 6/0096; B60Q 1/0011
  See application file for complete search history.

(56) References Cited

U.S. PATENT DOCUMENTS

| | | | | |
|---|---|---|---|---|
| 5,499,166 A | * | 3/1996 | Kato | B60Q 1/0011 362/511 |
| 5,562,335 A | * | 10/1996 | Okuchi | B60Q 1/0011 362/311.03 |
| 6,056,426 A | * | 5/2000 | Jenkins | B60Q 1/0011 362/511 |
| 2004/0001343 A1 | * | 1/2004 | Albou | F21S 48/1258 362/520 |

(Continued)

*Primary Examiner* — Y M. Lee
(74) *Attorney, Agent, or Firm* — Rosenberg, Klein & Lee (57) ABSTRACT

An automobile lamp having a lighting pattern with a light-and-shade contrast comprises a light guiding pipe, a projecting lens, and a lightening body. Two ends of the light guiding pipe are respectively arranged a light input surface and a light output portion. A light refracting groove is arranged at a bottom surface formed in front of the light output portion and includes a long inclined surface and a short inclined surface. The projecting lens has a light input surface and an arc light output surface. The lightening body projects an original light source opposite to the light input surface of the light guiding pipe. One part of lights of the lightening body is guided to the projecting lens for projecting a lighting pattern with a light-and-shade cut-off line, and the other part of lights is guided toward the lighting pattern to partially overlap the lighting pattern.

8 Claims, 6 Drawing Sheets

(56) References Cited

U.S. PATENT DOCUMENTS

2013/0021812 A1* 1/2013 Schug et al. ......... F21S 48/1154
  362/487
2014/0016343 A1* 1/2014 Brendle ............... F21S 48/1159
  362/518

* cited by examiner

AUTOMOBILE LAMP HAVING A LIGHTING PATTERN WITH A LIGHT-AND-SHADE CONTRAST

BACKGROUND OF THE INVENTION

1. Field of the Invention

The present invention relates to an automobile lamp, and especially relates to an automobile lamp having a lighting pattern with a light-and-shade contrast. It uses a concave micro structure which is arranged on a light guiding pipe to make the lighting pattern projected from the automobile lamp have better light-and-shade contrast.

2. Description of Related Art

In recent years, in order to improve driving safety, the lighting contrast of the lighting pattern of the automobile lamp is requested to increase and improve. Generally, the light spot may be focused to the side by the light reflecting surface to fit in with the request of the contrast. However, the lights may be guided evenly by the light guiding pipe and the left side and the right side of the lighting pattern have different brightness. It is hard to conform the request of regulations, even the bylaws of the lamp vehicle factory.

Please reference to Taiwanese patent no. I338637. It disclosed an automobile lamp. It includes a light emitting element used as an initial light source, a light guide element for calculating a divergence angle and a light emitting area of the divergence angle of the initial light source, and a lens element to enhance a light extraction efficiency of the light emitting element and produce a light source with a predetermined light pattern and a high light extraction efficiency. A projecting element is used for enhancing the contrast of the light pattern of the light source, so that the automobile lamp can project a high-contrast cutoff line. A light emitting surface of the light emitting element is designed with a predetermined shape, such that no other optical component is required for projecting a light beam with a cross-section of a predetermined shape, so as to enhance a light energy utilization efficiency of the automobile lamp effectively.

Figure 5:
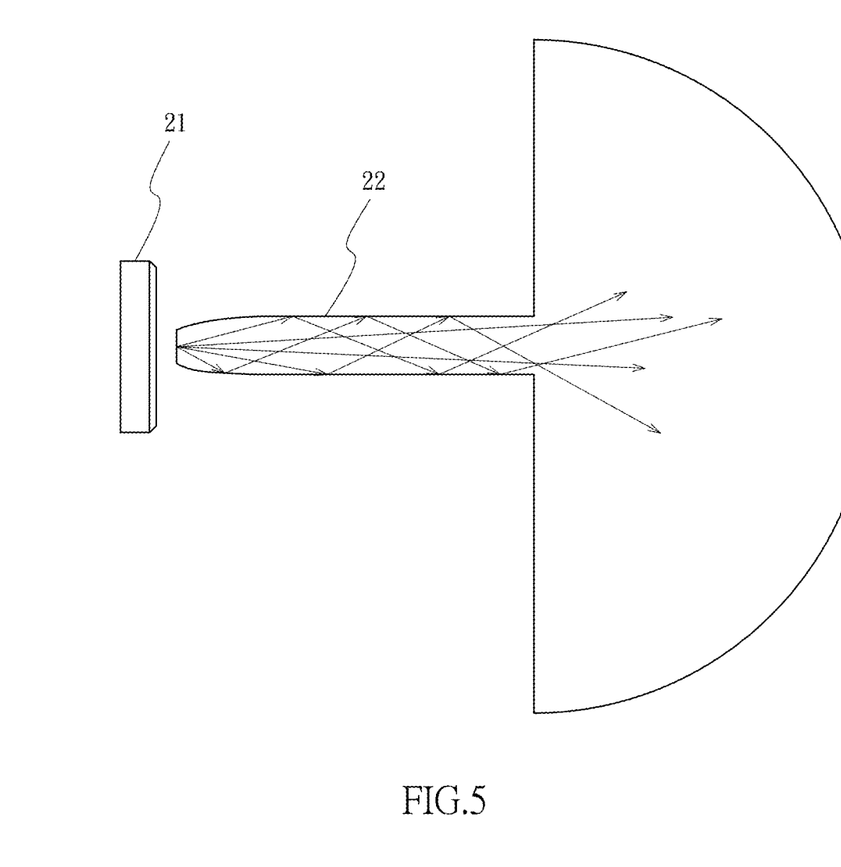
FIG. 5 is a view of a light path of a light emitting element and light guiding element of an automobile lamp which is disclosed by Taiwanese patent No. I338637.

Please refer to FIG. 5, it is a view of a light path of a light emitting element and light guiding element of an automobile lamp which is disclosed by Taiwanese patent No. I338637. That is, the light input surface of the light guiding element is connected with the lighting surface of the light emitting element. After the light guiding element receives the lights of the original light source, the lights are focused and regularly guided to evenly emit outwardly. Although the light energy utilization efficiency is improved by the light guiding element, the lighting pattern and the light-and-shade contrast are not changed.

Figure 6:
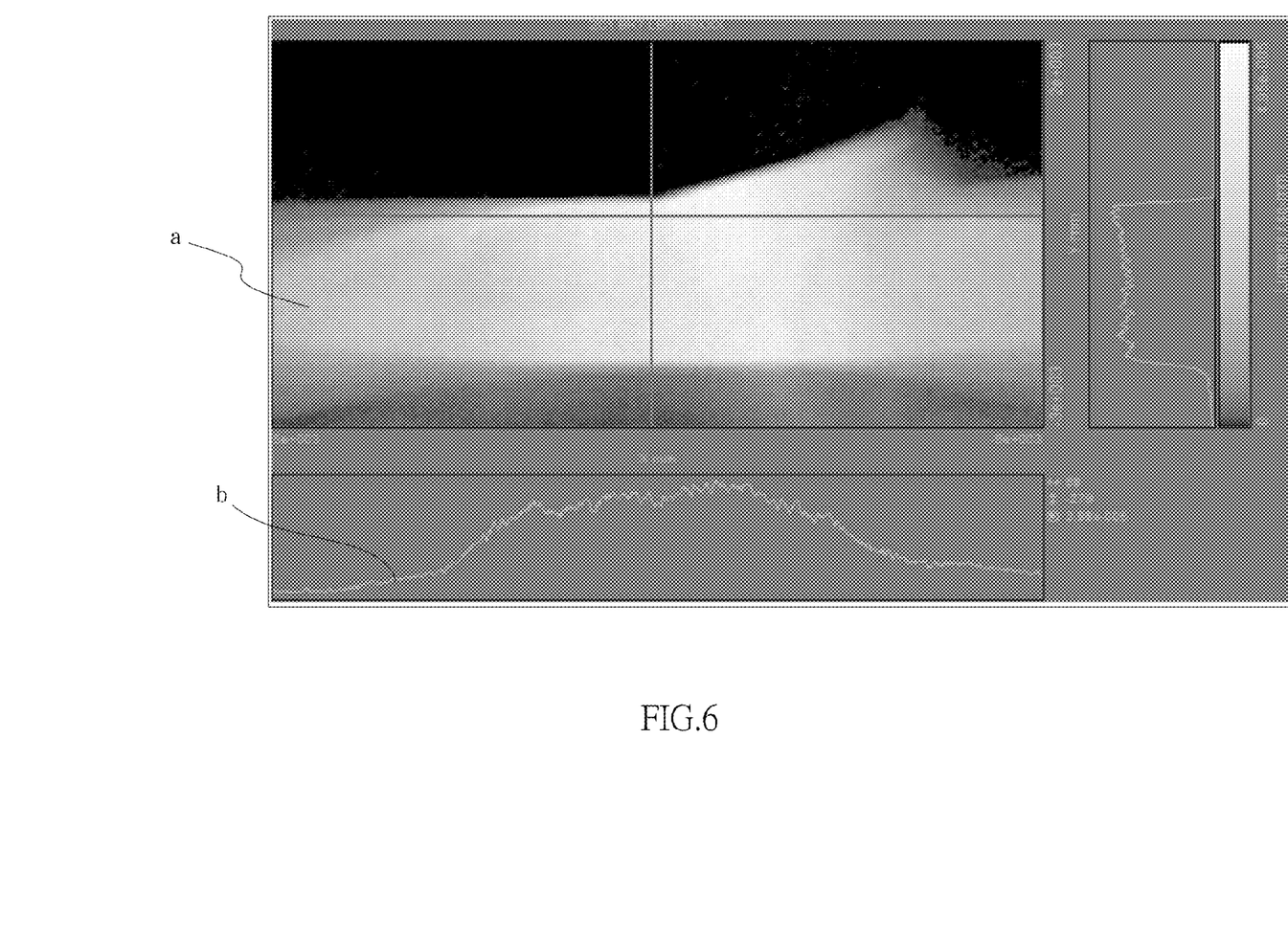
FIG. 6 is a view of a lighting pattern (a) which is projected by a light guiding path of the light guiding element and a light intensity distribution curve (b) in the horizontal dimension of a conventional automobile lamp.

Please reference to FIG. 6, it is a view of a lighting pattern (a) which is projected by a light guiding path of the light guiding element and a light intensity distribution curve (b) in the horizontal dimension of a conventional automobile lamp. The left side and the right side of the lighting pattern (a) is hard to find any visual difference, but the light intensity distribution curve (b) in the horizontal dimension shows a smooth curve distribution. Therefore, the difference between the left side and the right side of the light and shade of the lighting pattern (a) is small so that it may not conform the stricter request of regulations.

The design of the automobile lamp may cooperate with a light-shielding sheet so as to make the lights emitted from the light emitting element be shielded by the light-shielding sheet. And some of the lights may be projected in parallel from the projecting lens to form a cross-sectional light beam to conform regulations. However, it will decrease the light energy utilization efficiency due to the light-shielding sheet. It is one of the disadvantages of the conventional automobile lamp.

In addition, the light-shielding sheet added in the conventional automobile lamp further makes the structure and assembly more complicated and the weight heavier. It is another of the disadvantages of the conventional automobile lamp.

In view of the foregoing circumstances, the inventor has invested a lot of time to study the relevant knowledge, compare the pros and cons, research and develop related products. After quite many experiments and tests, the "automobile lamp" of this invention is eventually launched to improve the foregoing shortcomings, to meet the public use.

SUMMARY OF THE INVENTION

Hence, how to improve the loss of the light energy utilization efficiency, simplify the complicated structure, lighten the weight, and modulate the energy distribution are the problems to be solved.

An object of this invention is providing an automobile lamp having a lighting pattern with a light-and-shade contrast. It may make the difference between the left-side bright section and the right-side bright section of the lighting pattern much larger to conform to stricter request of the regulations while the light energy has no loss.

Another object of this invention is providing an automobile lamp having a lighting pattern with a light-and-shade contrast. It may prevent the assembly from being complicated and the weight from increasing to achieve the effects of lightening structure.

In order to achieve above mentioned objects, an automobile lamp having a lighting pattern with a light-and-shade contrast is provided. The automobile lamp may comprise a light guiding pipe, two ends thereof are respectively arranged a light input surface and a light output portion, a light refracting groove is arranged at a bottom surface formed in front of the light output portion of the light guiding pipe, the light refracting groove includes a long inclined surface and a short inclined surface, and the long inclined surface is arranged adjacent to the light input surface; a projecting lens, having a light input surface and an arc light output surface, the light input surface of the projecting lens is faced to the light output portion of the light guiding pipe; and a lightening body, projecting an original light source opposite to the light input surface of the light guiding pipe, one part of lights of the lightening body is guided by the light guiding pipe to the projecting lens for projecting a lighting pattern with a light-and-shade cut-off line, and the other part of lights of the lightening body is guided by the long inclined surface of the light refracting groove toward the lighting pattern to partially overlap the lighting pattern, and then a left-side brightness and a right-side brightness of the lighting pattern are formed light-and-shade contrast.

In some embodiments, the light guiding pipe includes a light guiding portion for connecting with the light output portion, the light input surface is arranged at one end of the light guiding portion opposite to the light output portion, an upper light guiding surface, a lower light guiding surface, and two side light guiding surfaces respectively connected with the upper light guiding surface and the lower light guiding surface are formed at a peripheral of the light guiding portion, the light refracting groove is arranged in the lower light guiding surface, a light guiding convex strip is arranged at a side of the lower light guiding surface corresponding to the light refracting groove, a light guiding inclined surface is arranged between a side of the light refracting groove formed in the lower light guiding surface and one of the two side light guiding surfaces, the light guiding inclined surface makes the light-and-shade cut-off line smoother, and the light guiding convex strip makes the light-and-shade cut-off line form an inclined section.

In some embodiments, a distance between the light refracting groove and the light output portion is larger than 0.5 mm, a depth of the light refracting groove is less than two-thirds of a thickness of the light guiding portion, and a length of the long inclined surface of the light refracting groove is longer than a length of the short inclined surface of the light refracting groove.

In some embodiments, the light output portion is a hemisphere structure and has a spherical light output surface.

In some embodiments, two light guiding concave grooves are arranged at the light input surface of the projecting lens and make the light-and-shade cut-off line smoother.

The various objectives and advantages of the present invention will be more readily understood from the following detailed description when read in conjunction with the appended drawing.

DETAILED DESCRIPTION OF THE INVENTION

To describe clearly that the present invention achieves the foregoing objective and function, the technical features and desired function are described with reference to a preferred embodiment and accompanying drawings.

Figure 1:
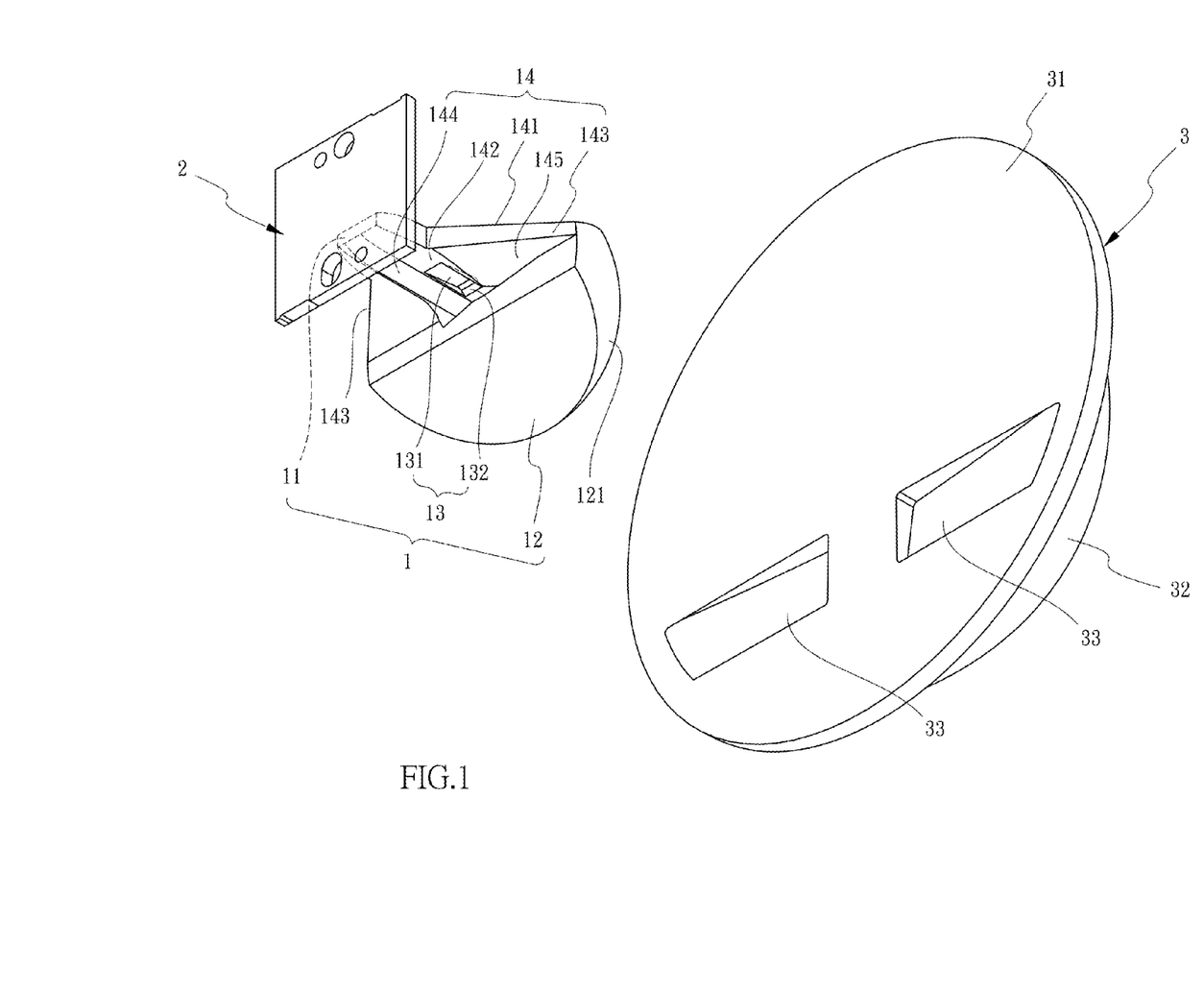
FIG. 1 is an exploded view of an automobile lamp having a lighting pattern with a light-and-shade contrast of the present invention.
Figure 2:
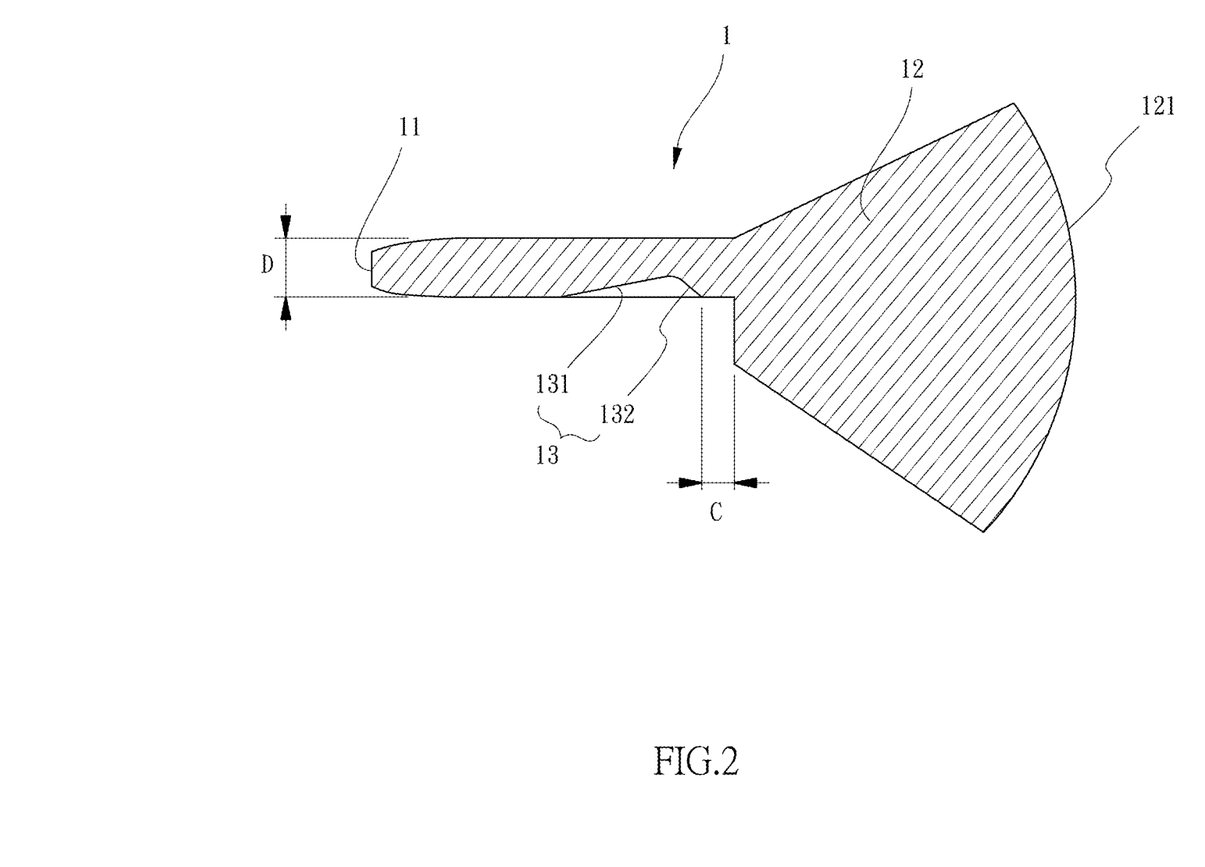
FIG. 2 is a cross-sectional view of a light guiding pipe of the automobile lamp of the present invention.

Please reference to FIGS. 1 and 2, an automobile lamp having a lighting pattern with the light-and-shade contrast of present invention may comprise a light guiding pipe 1, a projecting lens 3, and a lightening body 2.

Two ends of the light guiding pipe 1 are respectively arranged a light input surface 11 and a light output portion 12. A light refracting groove 13 is arranged at a bottom surface which is formed in front of the light output portion 12 of the light guiding pipe 1. The light refracting groove 13 includes a long inclined surface 131 and a short inclined surface 132, and the long inclined surface 131 is arranged adjacent to the light input surface 11.

The projecting lens 3 has a light input surface 31 and an arc light output surface 32. The light input surface 31 of the projecting lens 3 is faced to the light output portion 12 of the light guiding pipe 1.

The lightening body 2 is projecting an original light source opposite to the light input surface 11 of the light guiding pipe 1. One part of lights of the lightening body 2 is guided by the light guiding pipe 1 to the projecting lens 3 for projecting a lighting pattern (A, shown as in FIG. 4) with a light-and-shade cut-off line, and the other part of lights of the lightening body 2 is guided by the long inclined surface 131 of the light refracting groove 13 toward the lighting pattern to partially overlap the lighting pattern. And then a left-side brightness and a right-side brightness of the lighting pattern are formed better light-and-shade contrast.

In FIG. 1, two light guiding concave grooves 33 are arranged at the light input surface 31 of the projecting lens 3 and make the light-and-shade cut-off line (A1, shown as in FIG. 4) of the lighting pattern (A, shown as in FIG. 4) smoother. The light guiding pipe 1 includes a light guiding portion 14 for connecting with the light output portion 12. The light input surface 11 is arranged at one end of the light guiding portion 14 opposite to the light output portion 12. An upper light guiding surface 141, a lower light guiding surface 142, and two side light guiding surfaces 143 which are respectively connected with the upper light guiding surface 141 and the lower light guiding surface 142 are formed at a peripheral of the light guiding portion 14. The light refracting groove 13 is arranged in the lower light guiding surface 142. A light guiding convex strip 144 is arranged at a side of the lower light guiding surface 142 corresponding to the light refracting groove 13. A light guiding inclined surface 145 is arranged between a side of the light refracting groove 13 formed in the lower light guiding surface 142 and one of the two side light guiding surfaces 143. The light guiding inclined surface 145 makes the light-and-shade cut-off line (A1, shown as in FIG. 4) of the lighting pattern (A, shown as in FIG. 4) smoother, and the light guiding convex strip 144 makes the light-and-shade cut-off line (A1, shown as in FIG. 4) form an inclined section (A2, shown as in FIG. 4). Please refer to FIG. 2, a distance between the light refracting groove 13 of the light guiding portion 14 and the light output portion 12 is larger than 0.5 mm. A depth of the light refracting groove 13 is less than two-thirds of a thickness of the light guiding portion 14. And a length of the long inclined surface 131 of the light refracting groove 13 is longer than a length of the short inclined surface 132 of the light refracting groove 13. Therefore, the lights which are refracted from the light refracting groove 13 may not be lost or become stray lights. Furthermore, the light output portion 12 may be a hemisphere structure and has a spherical light output surface 121.

Figure 3:
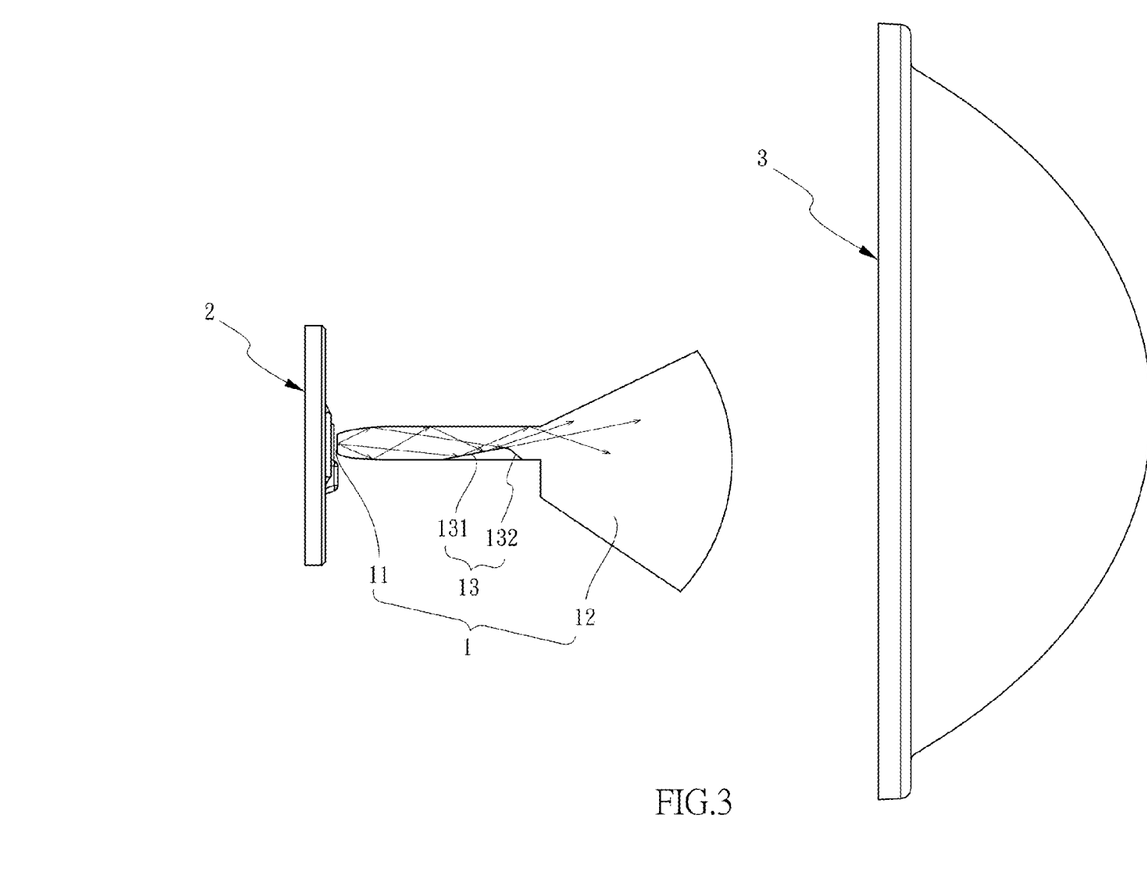
FIG. 3 is a view of a light guiding path of the light guiding pipe of the automobile lamp of the present invention.

Please refer to FIG. 3, it is a view of a light guiding path of the light guiding pipe 1 of the automobile lamp of the present invention. The lightening body 2 is projecting an original light source opposite to the light input surface 11 of the light guiding pipe 1. One part of lights of the lightening body 2 is guided by the light guiding pipe 1 to the light output portion 12 and then guided by the projecting lens 3 for projecting the light-and-shade cut-off line (A1, shown as in FIG. 4) of the lighting pattern (A, shown as in FIG. 4). The two light guiding concave grooves 33 which are arranged at the light input surface 31 of the projecting lens 3 cooperates with the light guiding inclined surface 145 may make the light-and-shade cut-off line A1 smoother. The light guiding strip 144 may make the light-and-shade cut-off line A1 have an inclination of the inclined section A2 to conform to the request of the regulations (15 degree or 45 degree). And the other part of lights of the lightening body 2 is guided by the long inclined surface 131 of the light refracting groove 13 toward the lighting pattern to partially overlap the lighting pattern A. And then a left-side brightness and a right-side brightness of the lighting pattern are formed better light-and-shade contrast. That is, the structure of the automobile lamp may not lose the light energy and further make the difference of a right-side bright section and a left-side bright section of the light-and-shade contrast of the lighting pattern much larger to conform to the request of the stricter regulations.

Figure 4:
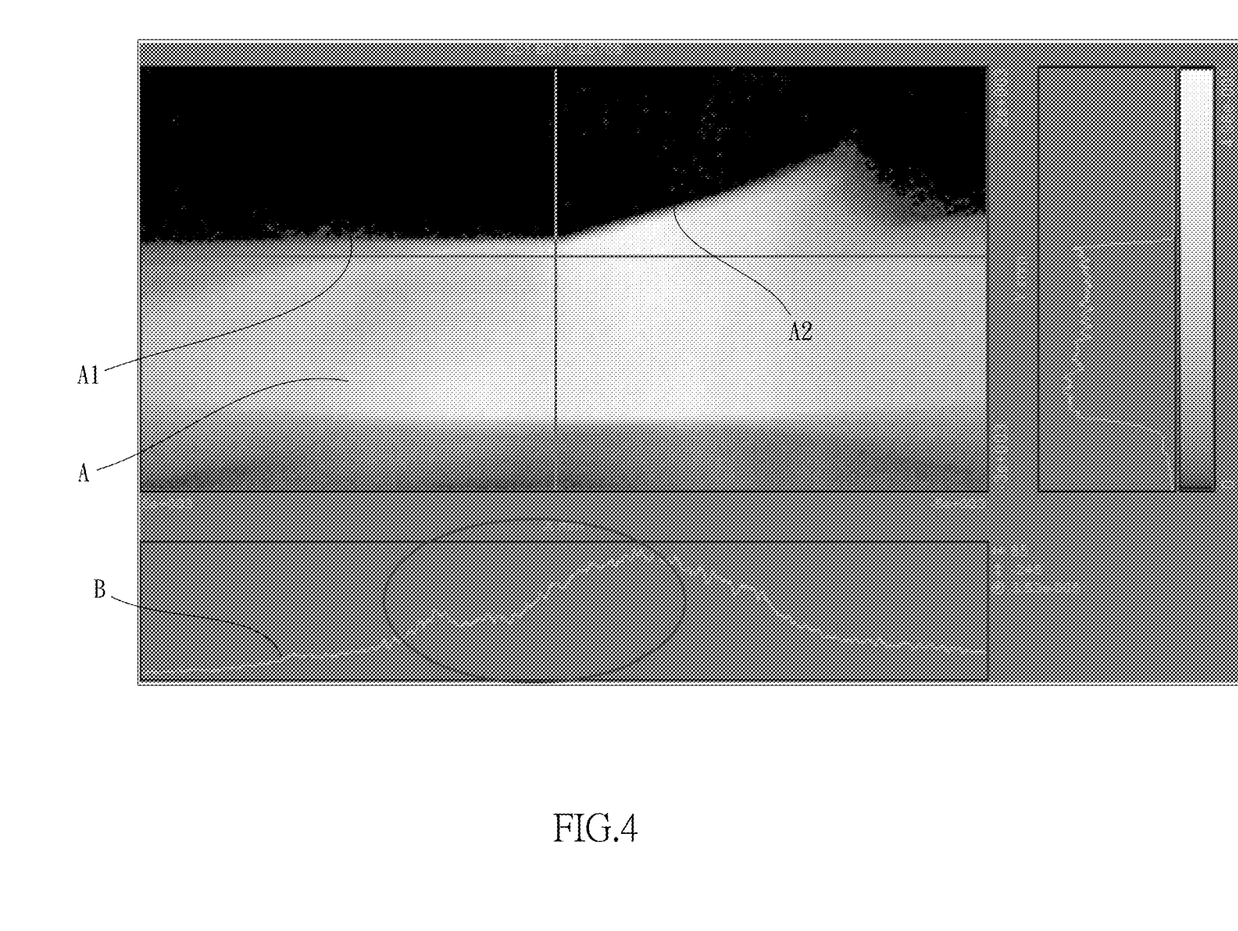
FIG. 4 is a view of a lighting pattern (A) which is projected from the light guiding path of the light guiding pipe and a light intensity distribution curve (B) in a horizontal dimension of the automobile lamp of the present invention.

Please refer to FIG. 4, it is a view of a lighting pattern (A) which is projected from the light guiding path of the light guiding pipe 1 and a light intensity distribution curve (B) in a horizontal dimension of the automobile lamp of the present invention. In FIG. 4, the lighting pattern A may have a visual difference of the right-side and left-side light and shade. A lower side of the light intensity distribution curve B in the horizontal dimension shows a shaper curve distribution and shows a larger difference of the light-and-shade contrast of the lighting pattern A.

One part of lights of the lightening body 2 is guided by the light guiding pipe 1 to the light output portion 12 and then guided by the projecting lens 3 for projecting the lighting pattern A. And the other part of lights of the lightening body 2 is guided by a micro structure of the long inclined surface 131 of the light refracting groove 13 toward the lighting pattern to partially overlap the lighting pattern A. The structure of the automobile lamp of present invention may not lose the light energy and further make the difference of the right-side bright section and the left-side bright section of the light-and-shade contrast of the lighting pattern A much larger to conform to the request of the stricter regulations. It may also have a simplified structure and light weight.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. An automobile lamp having a lighting pattern with a light-and-shade contrast, comprising:
   a light guiding pipe having a light input surface and a light output portion at two ends of the light guiding pipe respectively, a light refracting groove being arranged at a bottom surface formed in front of the light output portion of the light guiding pipe, the light refracting groove including a long inclined surface and a short inclined surface, and the long inclined surface being arranged adjacent to the light input surface;
   a projecting lens, having a light input surface and an arc light output surface, the light input surface of the projecting lens facing the light output portion of the light guiding pipe; and
   a lightening body, projecting an original light source opposite to the light input surface of the light guiding pipe, one part of lights of the lightening body being guided by the light guiding pipe to the projecting lens for projecting a lighting pattern with a light-and-shade cut-off line, and the other part of lights of the lightening body being guided by the long inclined surface of the light refracting groove toward the lighting pattern to partially overlap the lighting pattern, and then a left-side brightness and a right-side brightness of the lighting pattern forming light-and-shade contrast.

2. The automobile lamp as claimed in claim 1, wherein the light guiding pipe includes a light guiding portion for connecting with the light output portion, the light input surface is arranged at one end of the light guiding portion opposite to the light output portion, an upper light guiding surface, a lower light guiding surface, and two side light guiding surfaces respectively connected with the upper light guiding surface and the lower light guiding surface are formed at a peripheral of the light guiding portion, the light refracting groove is arranged in the lower light guiding surface, a light guiding convex strip is arranged at a side of the lower light guiding surface corresponding to the light refracting groove, a light guiding inclined surface is arranged between a side of the light refracting groove formed in the lower light guiding surface and one of the two side light guiding surfaces, the light guiding inclined surface makes the light-and-shade cut-off line smoother, and the light guiding convex strip makes the light-and-shade cut-off line form an inclined section.

3. The automobile lamp as claimed in claim 2, wherein a distance between the light refracting groove and the light output portion is larger than 0.5 mm, a depth of the light refracting groove is less than two-thirds of a thickness of the light guiding portion, and a length of the long inclined surface of the light refracting groove is longer than a length of the short inclined surface of the light refracting groove.

4. The automobile lamp as claimed in claim 1, wherein the light output portion is a hemisphere structure and has a spherical light output surface.

5. The automobile lamp as claimed in claim 1, wherein two light guiding concave grooves are arranged at the light input surface of the projecting lens and make the light-and-shade cut-off line smoother.

6. The automobile lamp as claimed in claim 2, wherein two light guiding concave grooves are arranged at the light input surface of the projecting lens and make the light-and-shade cut-off line smoother.

7. The automobile lamp as claimed in claim 3, wherein two light guiding concave grooves are arranged at the light input surface of the projecting lens and make the light-and-shade cut-off line smoother.

8. The automobile lamp as claimed in claim 4, wherein two light guiding concave grooves are arranged at the light input surface of the projecting lens and make the light-and-shade cut-off line smoother.

* * * * *